United States Patent
Luo et al.

(10) Patent No.: US 11,284,342 B2
(45) Date of Patent: Mar. 22, 2022

(54) METHOD AND APPARATUS FOR DEVICE FINDING AFTER NETWORK CONFIGURATION

(71) Applicant: General Electric Company, Schenectady, NY (US)

(72) Inventors: Xin Luo, Shanghai (CN); Charles Shi, Shanghai (CN); Dong Xing, Shanghai (CN); Aijun Wang, Shanghai (CN); Jiyong Zhang, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/328,737

(22) PCT Filed: Aug. 15, 2017

(86) PCT No.: PCT/CN2017/097510
§ 371 (c)(1),
(2) Date: Feb. 27, 2019

(87) PCT Pub. No.: WO2019/033267
PCT Pub. Date: Feb. 21, 2019

(65) Prior Publication Data
US 2020/0178169 A1    Jun. 4, 2020

(51) Int. Cl.
*H04W 48/20*    (2009.01)
*H04L 29/06*    (2006.01)
(Continued)

(52) U.S. Cl.
CPC .......... *H04W 48/20* (2013.01); *H04L 63/083* (2013.01); *H04W 12/06* (2013.01); *H04W 48/16* (2013.01); *H04W 84/12* (2013.01)

(58) Field of Classification Search
CPC ..... H04W 48/20; H04W 12/06; H04W 48/16; H04W 84/12; H04W 84/18; H04W 4/80; H04W 76/14; H04W 8/005; H04L 63/083
See application file for complete search history.

(56) References Cited

U.S. PATENT DOCUMENTS

| 2008/0019367 | A1 | 1/2008 | Ito et al. |
| 2009/0164785 | A1 | 6/2009 | Metke et al. |

(Continued)

FOREIGN PATENT DOCUMENTS

| CN | 102572836 A | 7/2012 |
| CN | 102711282 A | 10/2012 |

(Continued)

OTHER PUBLICATIONS

International Search Report and Written Opinion issued in connection with corresponding PCT application No. PCT/CN2017/097510 dated May 14, 2018.

*Primary Examiner* — Dady Chery
(74) *Attorney, Agent, or Firm* — Armstrong Teasdale LLP

(57) ABSTRACT

A method and apparatus for device finding after network configuration are disclosed. The method for device finding includes: sending a message to a smart device in an Access Point (AP) mode, the message comprising information for connecting to a first router or AP; changing connection from the smart device to a network; performing a local scanning when connecting to the first router or AP; and performing a cloud scanning when the local scanning fails.

20 Claims, 7 Drawing Sheets

(51) Int. Cl.
*H04W 12/06* (2021.01)
*H04W 48/16* (2009.01)
*H04W 84/12* (2009.01)

(56) References Cited

U.S. PATENT DOCUMENTS

| | | | |
|---|---|---|---|
| 2016/0212695 A1* | 7/2016 | Lynch | H04W 48/18 |
| 2017/0257896 A1* | 9/2017 | Zong | H04L 65/4076 |
| 2019/0289490 A1* | 9/2019 | Conant | H04W 28/0231 |

FOREIGN PATENT DOCUMENTS

| | | |
|---|---|---|
| CN | 102843686 A | 12/2012 |
| CN | 103533512 A | 1/2014 |
| CN | 104640174 A | 5/2015 |
| KR | 20130069043 A | 6/2013 |

\* cited by examiner

METHOD AND APPARATUS FOR DEVICE FINDING AFTER NETWORK CONFIGURATION

FIELD

The present disclosure generally relates to techniques of device finding. More specifically, the present disclosure relates to a method, a mobile apparatus, a smart device and a machine-readable medium for device finding after network configuration.

BACKGROUND

Smart electronic devices have been becoming more and more popular in daily life and industry. A smart electronic device is generally able to connect to other devices or networks via different wireless protocols such as Bluetooth, NFC, Wi-Fi, mobile communication protocols, etc. For example, a smart phone user can easily utilize his/her phone to connect to and control another smart device such as an intelligent electronic apparatus.

For connecting to another device, a smart electronic device needs to find the another device, and then establish a connection with it. Through the established connection, the smart electronic device can exchange data with the connected device.

But sometimes, it is difficult to find another device and establish an efficient communication with it. This will result in significantly poor user experience.

Thus, there is a need for an improved method and apparatus for finding targeted device and establishing a connection with it.

SUMMARY

An objective of the embodiments of present disclosure is to provide an improved method and apparatus for device finding.

In a first aspect of present disclosure, a method for device finding is provided. The method includes: sending a message to a smart device in an Access Point (AP) mode, the message comprising information for connecting to a first router or AP; changing connection from the smart device to a network; performing a local scanning when connecting to the first router or AP; and performing a cloud scanning when the local scanning fails.

In a second aspect of present disclosure, a mobile apparatus is provided. The mobile apparatus includes: at least one communication module; a processing unit coupled to the at least one communication module. The processing unit is to: send a message to a smart device in an Access Point (AP) mode, the message comprising information for connecting to a first router or AP; change connection from the smart device to a network; perform a local scanning when connecting to the first router or AP; and perform a cloud scanning when the local scanning fails.

In a third aspect of present disclosure, a machine readable medium is provided. The machine readable medium has stored thereon instructions, when executed, to cause a machine to: send a message to a smart device in an Access Point (AP) mode, the message comprising information for connecting to a first router or AP; determine a change of connection from the smart device to a network; perform a local scanning when connecting to the first router or AP; and perform a cloud scanning when the local scanning fails.

BRIEF DESCRIPTION OF THE DRAWINGS

The present disclosure can be better understood in light of description of embodiments of the present disclosure with reference to the accompanying drawings, in which.

DETAILED DESCRIPTION

Unless defined otherwise, the technical or scientific terms used herein should have the same meanings as commonly understood by one of ordinary skilled in the art to which the present disclosure belongs. The terms "first", "second" and the like in the Description and the Claims of the present application for disclosure do not mean any sequential order, number or importance, but are only used for distinguishing different components. Likewise, the terms "a", "an" and the like do not denote a limitation of quantity, but denote the existence of at least one. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", but do not exclude other elements or objects.

An embodiment is an implementation or example. Reference in the specification to "an embodiment," "one embodiment," "some embodiments," "other embodiments," or "further embodiments" means that a particular feature, structure, or characteristic described in connection with the embodiments is included in at least some embodiments, but not necessarily all embodiments, of the present disclosure. The various appearances of "an embodiment," "one embodiment," or "some embodiments" are not necessarily all referring to the same embodiments. Elements or aspects from an embodiment can be combined with elements or aspects of another embodiment.

Figure 1:
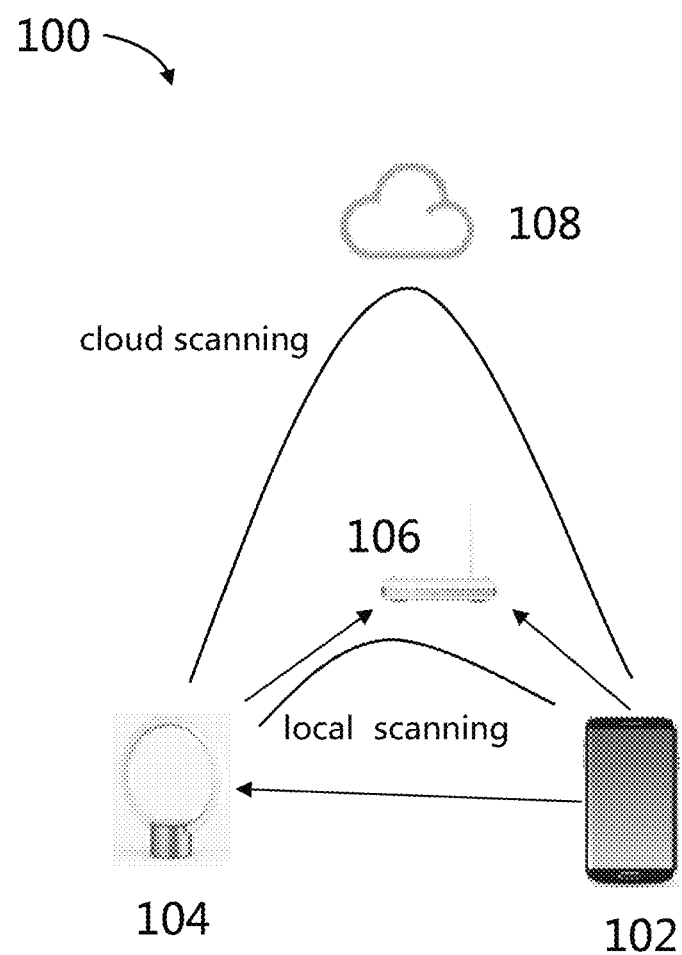
FIG. 1 illustrates a schematic diagram of device finding after network configuration according to an embodiment of present disclosure.

FIG. 1 illustrates a schematic diagram 100 of device finding after network configuration according to an embodiment of present disclosure. In the shown embodiment, a mobile apparatus 102 is intended to establish a communication with a smart device 104. Although the mobile apparatus 102 and smart device 104 are shown as a mobile phone and a smart lamp, respectively, one of ordinary skilled in the art could understand that they are merely exemplary embodiments and can be replaced with other smart electronic devices. The mobile apparatus 102 may include, but is not limited to, a personal digital assistant, a tablet computer, a laptop computer, an ultraportable computer, an ultramobile computer, etc. The smart device 104 may include, but is not limited to, a smart lamp, an intelligent electrical apparatus such as an intelligent speaker and an intelligent television, etc.

As shown in FIG. 1, the mobile apparatus 102 sends a message to the smart device 104 in an Access Point (AP) mode. The message comprises information for connecting to a router or AP 106. For example, the information may include a Service Set Identifier (SSID) of the router or AP 106 and a password for connecting to the router or AP 106. In some embodiments, the mobile apparatus 102 may directly connect to the smart device 104 in an AP mode and sends the message.

Upon receiving the message, the smart device 104 switches from the AP mode to a station mode, and then, tries to connect to the router or AP 106. In some embodiments, the smart device 104 finds the router or AP 106 with the SSID and connects to this router or AP 106 using the received password.

On the other side, the mobile apparatus 102 changes connection from the smart device 106 to another network. The network may include, but is not limited to, the same router or AP 106, a different router or AP, a mobile communication network, etc. The mobile communication network may include, but is not limited to, the $3^{rd}$ Generation of Mobile Communication Technology Standards (3G), such as W-CDMA, CDMA2000, TD-SCDMA, and WiMAX; the $4^{th}$ Generation of Mobile Communication Technology Standards (4G), such as LTE/LTE-Advanced, and Wierless-MAN-Advanced; and so on. In some embodiments, an Operating System (OS) of the mobile apparatus 102 may automatically connect to another network. In some other embodiments, the mobile apparatus 102 may allow a user to manually select a network to connect with. The mobile apparatus 102 receives the selection from the user and connect to the selected network. In some further embodiments, an application in the mobile apparatus 102 may control the selection of another network. The application may receive an input from a user to control the selection, or automatically control the selection according to a predetermined rule. The predetermined rule may include, but is not limited to, a preference of the user, a priority list of available networks, a connection strategy, etc.

In the embodiment as shown, the mobile apparatus 102 connects to the same router or AP 106. Then, the mobile apparatus 102 performs a local scanning to find the smart device 104 and establish a connection with it through the router or AP 106. For example, the mobile apparatus 102 may perform the local scanning under User Datagram Protocol (UDP) or other protocols.

But in some cases, the local scanning may fail. For example, the router or AP may be busy, which results in lost of a UDP package. In the router or AP, the related port, such as the UDP port, may be banned, and thus the local scanning is prohibited.

When the local scanning fails, the mobile apparatus 102 performs a scanning through cloud 108, as shown in FIG. 1. Specifically, in some embodiments, the mobile apparatus 102 establishes a connection with the cloud 108, and then searches a database of the cloud 108 for registration information of the smart device 104. The smart device 104 may pre-register in the cloud 108. With the cloud scanning, the mobile apparatus 102 may find the smart device 104 and establish a connection with it.

Figure 2:
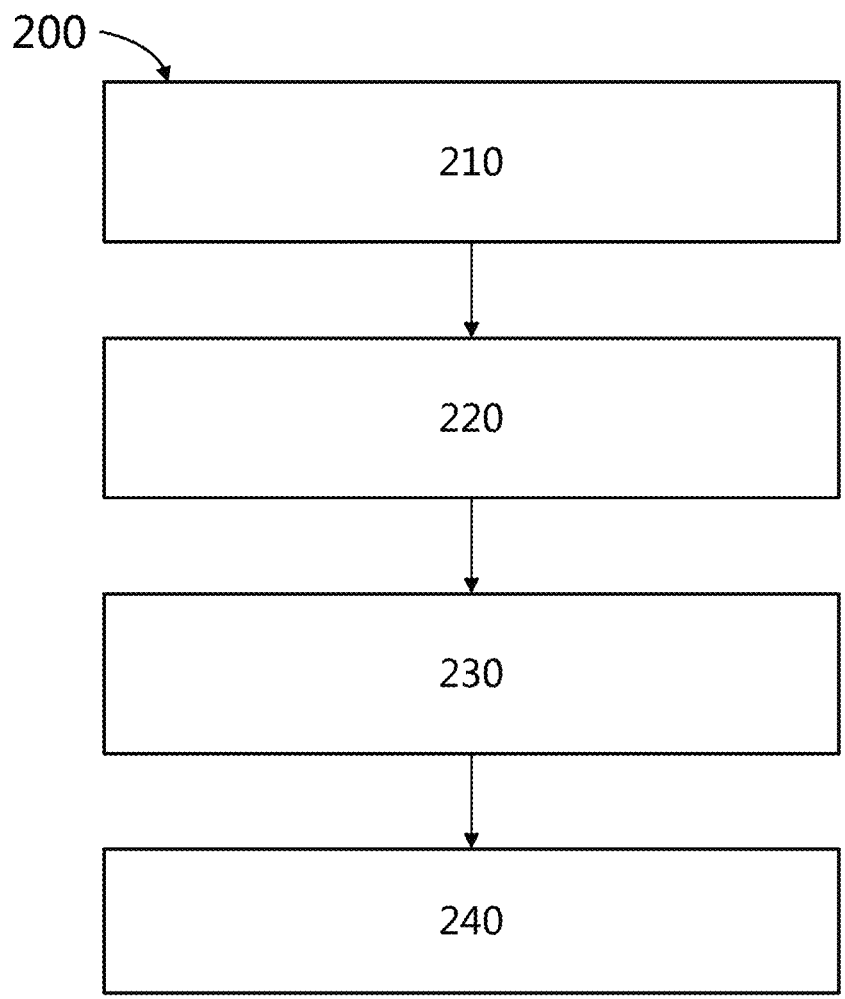
FIG. 2 illustrates a flow diagram for a process of device finding after network configuration according to an embodiment of present disclosure.

FIG. 2 illustrates a flow diagram for a process 200 of device finding after network configuration according to an embodiment of present disclosure. This process 200 can be performed by the mobile apparatus 102 as shown in FIG. 1 or any other smart apparatus. Some embodiments of this process 200 may be implemented in one or a combination of hardware, firmware, and software. Some embodiments of this process 200 may also be implemented by a machine readable medium having instructions stored thereon, which when read and executed, will cause a machine to perform the operations of this process 200.

As shown in FIG. 2, the process 200 starts with step 210, i.e., sending a message to a smart device in an AP mode. The message comprises information for connecting to a router or AP.

Then, the process 200 proceed to step 220, i.e., changing connection from the smart device to a network. The network includes, but is not limited to, the same router or AP, a different router or AP, a mobile communication network, etc. The mobile communication network may include, but is not limited to, the $3^{rd}$ Generation (3G), the $4^{th}$ Generation (4G) and the like. In some embodiments, changing connection may include automatically connecting to a network, or manually connecting to a network according to an input of a user. In some other embodiments, changing connection may include controlling a selection of a network. Control of the selection may be performed by an application according to an input of a user or automatically according to a predetermined rule. The predetermined rule may include, but is not limited to, a preference of the user, a priority list of available networks, a connection strategy, etc.

When connecting to the same router or AP as the smart device does, at step 230, the process 200 performs a local scanning. The smart device may have connected to this router or AP using the received information in the message sent in step 210. Thus, a connection may be established with the smart device through the local scanning.

But the local scanning may fail due to many reasons. When local scanning fails, at step 240, the process 200 performs a scanning through cloud. Specifically, in some embodiments, the process 200 establishes a connection with the cloud, and then searches a database of the cloud for registration information of the smart device. With the cloud scanning, a connection may be established with the smart device.

Figures 3A, 3B:
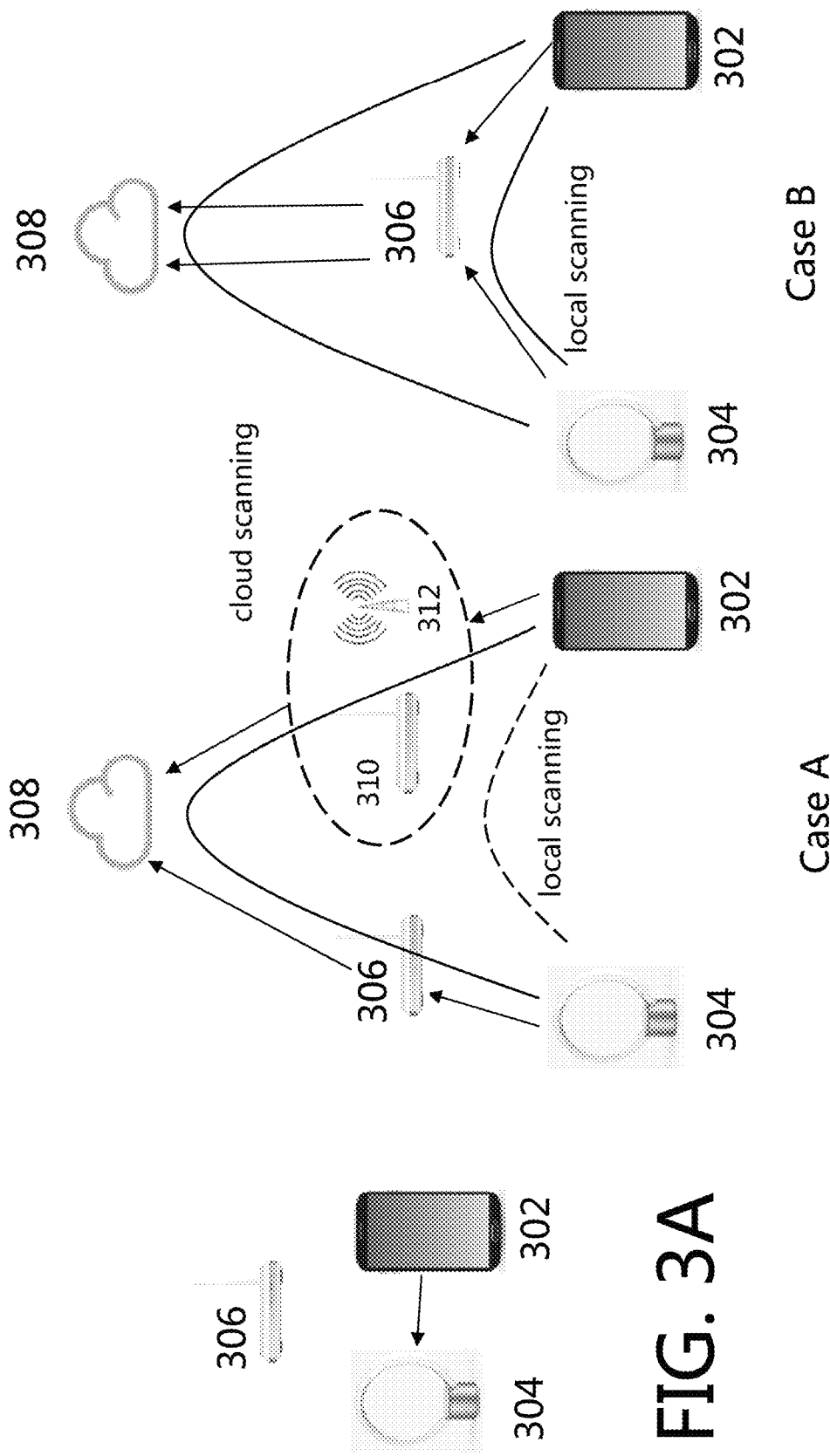
FIGS. 3A-3B illustrate schematic diagrams of device finding after network configuration in different ways according to embodiments of present disclosure.

FIGS. 3A-3B illustrate schematic diagrams of device finding after network configuration in different ways according to embodiments of present disclosure. Although a mobile apparatus 302 and a smart device 304 are shown as a mobile phone and a smart lamp, respectively, one of ordinary skilled in the art could understand that they are merely exemplary embodiments and could be replaced with other smart electronic devices. The mobile apparatus 302 may include, but is not limited to, a personal digital assistant, a tablet computer, a laptop computer, an ultraportable computer, an ultramobile computer, etc. The smart device 304 may include, but is not limited to, a smart lamp, an intelligent electrical apparatus such as an intelligent speaker and an intelligent television, etc.

As shown in FIG. 3A, the smart device 304 is in an AP mode. The mobile apparatus 302 connects to the smart device 304 and sends a message to it. The message comprises information for connecting to a router or AP 306. In some embodiments, the information may include a SSID of the router or AP 306 and a password for connecting to the router or AP 306.

As shown in FIG. 3B, upon receiving the message, the smart device 304 switches from the AP mode to a station mode, and then, tries to connect to the router or AP 306. In some embodiments, the smart device 304 finds the router or AP 306 with the SSID and connects to this router or AP 306 using the received password. Further, in some embodiments, the smart device 304 may also register in the cloud 308.

On the other side, the mobile apparatus 302 changes connection from the smart device 304 to another network. The network includes, but is not limited to, the same router or AP 306, a different router or AP 310, a mobile communication network 312, etc. The mobile communication network may include, but is not limited to, the $3^{rd}$ Generation (3G), such as W-CDMA, CDMA2000, TD-SCDMA, and WiMAX; the $4^{th}$ Generation (4G), such as LTE/LTE-Advanced, and WierlessMAN-Advanced; and so on. In some embodiments, since the signal from the smart device 304 in the AP mode disappears, an OS of the mobile apparatus 302 may automatically search for other available networks and connect to another network. In some other embodiments, the mobile apparatus 302 may allow a user to manually select a network to connect with. The mobile apparatus 302 receives the selection from the user and connect to the selected network. In some further embodiments, an application in the mobile apparatus 302 may control a selection of another network. The application may receive an input from a user to control the selection, or automatically control the selection according to a predetermined rule. The predetermined rule may include, but is not limited to, a preference of the user, a priority list of available networks, a connection strategy, etc.

In Case A of FIG. 3B, the mobile apparatus 302 connects to the mobile communication network 312 or a different router or AP 310. But present disclosure is not limited in this aspect. One of ordinary skilled in the art could understand that the mobile apparatus 302 may connect to other kinds of networks.

When connecting to the mobile communication network 312 or other networks, as shown in Case A of FIG. 3B, the mobile apparatus 302 performs a scanning through cloud 308. In some embodiments, the mobile apparatus 302 may connect to the cloud 308, and then search a database of the cloud 308 for registration information of the smart device. Then, the mobile apparatus 302 may find the smart device 304 and establish a connection with it.

In some embodiments, when connecting to a different router or AP 310, the mobile apparatus 302 may perform a local scanning and perform a cloud scanning when the local scanning fails. In some embodiments, an OS of the mobile apparatus 302 may automatically connect to the different router or AP 310, or the mobile apparatus 302 may receive a selection of the different router or AP 310 from a user and connect to the selected network. In these embodiments, the mobile apparatus 302 may not be able to distinguish the different router or AP 310 from the same router or AP 306. In other words, the mobile apparatus 302 may not know whether the connected router or AP is the same one as that the smart device 304 connects to, i.e., the router or AP 306. Then, the mobile apparatus 302 perform a local scanning first because the local scanning is faster and preferable. But if the local scanning fails, then the mobile apparatus 302 turns to another way, i.e., cloud scanning, to establish a connection with the smart device 304.

In some embodiments, when connecting to a different router or AP 310, the mobile apparatus 302 may directly perform a cloud scanning. For example, a selection of another network may be under the control of an application in the mobile apparatus 302. The application may receive an input from a user to control the selection, or automatically control the selection according to a predetermined rule. In these embodiments, the mobile apparatus 302 knows whether it connects to the same router or AP 306 as the smart device 304 does. Then, the mobile apparatus is able to perform a cloud scanning directly when connecting to a different router or AP 310. This is more efficient because the local scanning is omitted in this case.

In Case B of FIG. 3B, the mobile apparatus 302 connects to the same router or AP 306 as the smart device 304 does. This case is similar to the embodiment as shown in FIG. 1.

The mobile apparatus 302 may perform a local scanning to find the smart device 304 and establish a connection with it through the router or AP 306. If the local scanning fails in some cases, the mobile apparatus 302 performs a scanning through cloud 308. With the cloud scanning, the mobile apparatus 302 may find the smart device 304 and establish a connection with it.

Figure 4:
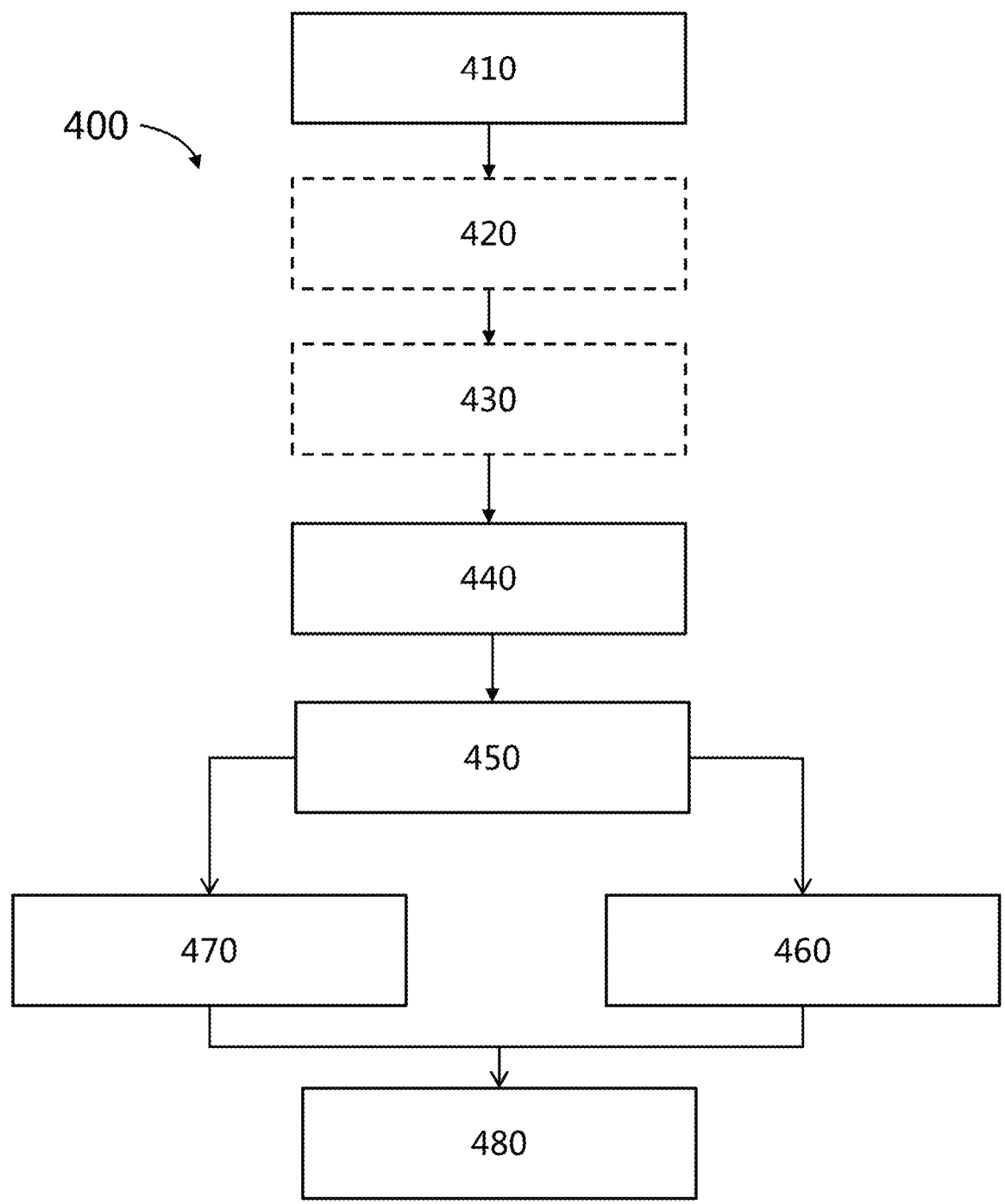
FIG. 4 illustrates another flow diagram for a process of device finding after network configuration according to an embodiment of present disclosure.

FIG. 4 illustrates another flow diagram for a process 400 of device finding after network configuration according to an embodiment of present disclosure. This process 400 can be performed by the mobile apparatus 102/302 and smart device 104/304 as shown in FIG. 1 or FIGS. 3A-3B, or any other smart apparatuses. For convenience, FIG. 4 will be described with reference to FIGS. 3A-3B. But one of ordinary skilled in the art would understand that present disclosure is not limited in this aspect.

Some embodiments or some parts of this process 400 may be implemented in one or a combination of hardware, firmware, and software. Some embodiments or some parts of this process 400 may also be implemented by a machine readable medium having instructions stored thereon, which when read and executed, will cause a machine to perform the operations of this process.

For clarity, the operations on the smart device side are illustrated in blocks with dashed lines, while the operations on the mobile apparatus side are shown in blocks with solid lines.

In block 410, the mobile apparatus connects to the smart device which is in an AP mode, and sends a message to it. The message comprises information for connecting to a router or AP.

In block 420, the smart device switches from the AP mode to a station mode, and connects to the router or AP using the information in the received message.

In block 430, the smart device registers in the cloud.

In block 440, the mobile apparatus changes connection from the smart device to another network. In this embodiment as shown, since the signal from the smart device in the AP mode disappears, an OS of the mobile apparatus may automatically search for other available networks and connect to another network, or may allow a user to manually select a network and connect to the selected network. The network may include, but is not limited to, the same router or AP, a different router or AP, a mobile communication network, etc.

In block 450, the mobile apparatus may determine the change of connection from the smart device to a network. In some embodiments, an application running on the mobile apparatus may know or recognize the change of connection to another network. But in some cases, if the mobile apparatus connect to a router or AP, the application may not be able to determine whether the connected router or AP is the same as that the smart device connects to.

Then, in block 460, when connecting to a router or AP, whether the same one or a different one, the mobile apparatus performs a local scanning first. This is because, if applicable, the local scanning is faster and preferable. But in some cases, the local scanning may fail. For example, the router/AP may be busy, which results in lost of a UDP package. In the router or AP, the related port, such as the UDP port, may be banned, and thus the local scanning is prohibited. In addition, if the mobile apparatus and the smart device connect to different routers or APs, the local scanning will fail. In any case, when the local scanning fails, then the mobile apparatus turns to the cloud scanning to establish a connection with the smart device.

In block 470, when connecting to the mobile communication network or other networks, the mobile apparatus performs a scanning through cloud.

In some embodiments, the cloud scanning includes connecting to the cloud, and then searching a database of the cloud for registration information of the smart device. In some embodiments, the local scanning is performed under UDP or other protocols.

In block 480, a connection may be established between the mobile apparatus and the smart device, and the process 400 of device finding ends.

Figure 5:
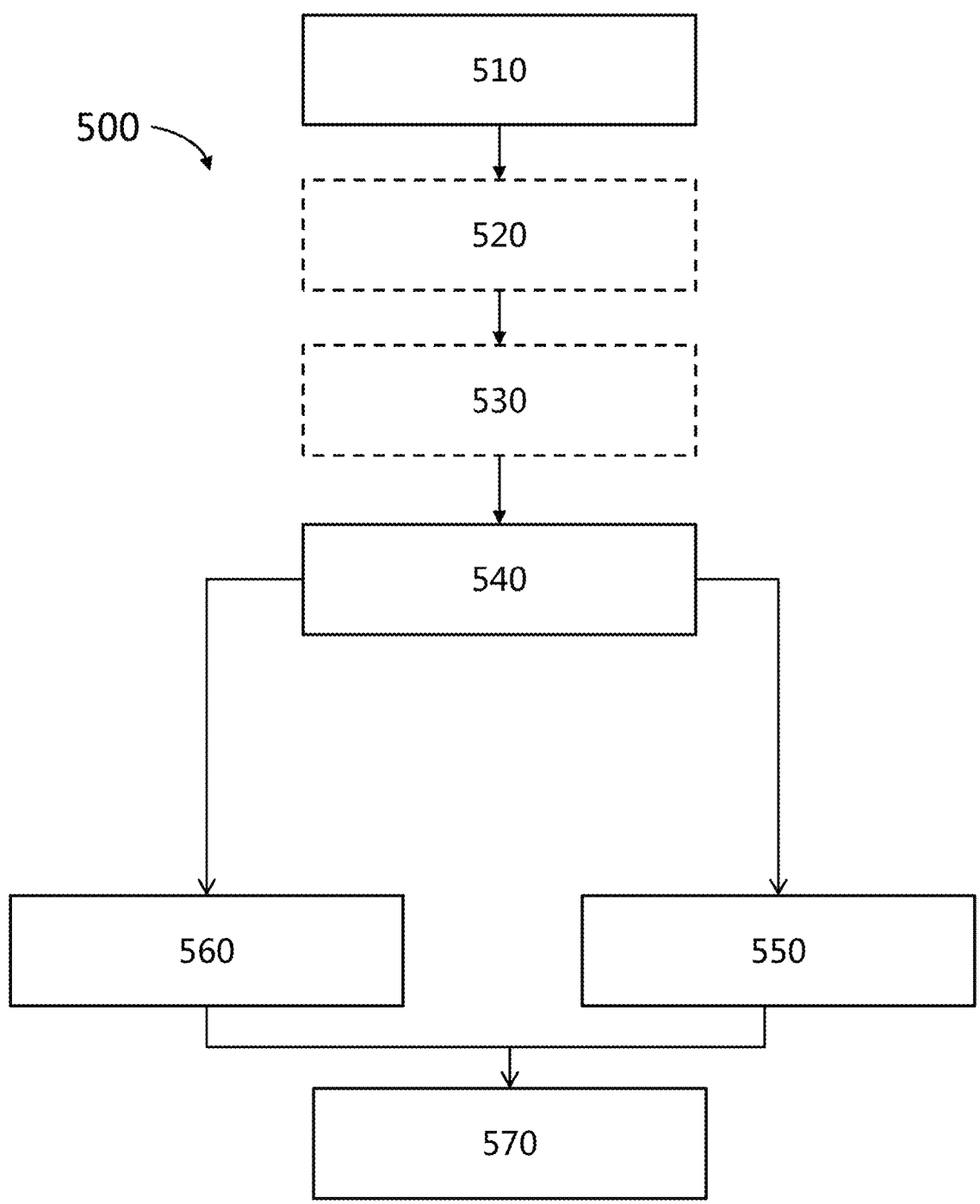
FIG. 5 illustrates a further flow diagram for a process of device finding after network configuration according to an embodiment of present disclosure.

FIG. 5 illustrates a further flow diagram for a process 500 of device finding after network configuration according to an embodiment of present disclosure. Similar to FIG. 4, FIG. 5 will be described with reference to FIGS. 3A-3B merely for convenience, not limitation. For clarity, the operations on the smart device side are illustrated in blocks with dashed lines, while the operations on the mobile apparatus side are shown in blocks with solid lines.

Similarly, some embodiments or some parts of this process 500 may be implemented in one or a combination of hardware, firmware, and software. Some embodiments or some parts of this process 500 may also be implemented by a machine readable medium having instructions stored thereon, which when read and executed, will cause a machine to perform the operations of this process 500.

Blocks 510-530 are similar to blocks 410-430 of FIG. 4, and thus will not be discussed in details.

In block 540, the mobile apparatus changes connection from the smart device to another network. The network may include, but is not limited to, the same router or AP, a different router or AP, a mobile communication network, etc.

In some embodiments, an application running on the mobile apparatus may determine a change of connection to another network. In this embodiment, the application may determine the change of connection by controlling the selection of the another network. The application may receive an input from a user to control the selection, or automatically control the selection according to a predetermined rule. The predetermined rule may include, but is not limited to, a preference of the user, a priority list of available networks, a connection strategy, etc. In these embodiments, the application knows whether the mobile apparatus connects to the same router or AP as the smart device does.

In block 550, when connecting to the same router or AP as the smart device does, the mobile apparatus may perform a local scanning. If the local scanning fails in some cases, the mobile apparatus performs a scanning through cloud.

In block 560, when connecting to a different router or AP from the smart device, to the mobile communication network or to other networks, the mobile apparatus may perform a cloud scanning.

In block 570, a connection may be established between the mobile apparatus and the smart device, and the process 500 of device finding ends.

Figure 6:
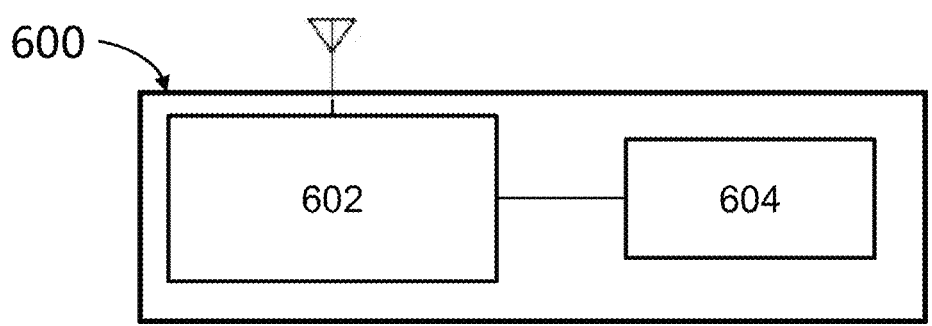
FIG. 6 illustrates an exemplary block diagram of a mobile apparatus according to an embodiment of present disclosure.

FIG. 6 illustrates an exemplary block diagram of a mobile apparatus 600 according to an embodiment of present disclosure. The mobile apparatus 600 may include, but is not limited to, a mobile phone, a personal digital assistant, a tablet computer, a laptop computer, an ultraportable computer, an ultramobile computer, and the like. A mobile phone includes, but is not limited to a smart phone, (e.g., iPhone®, Android®-based phone, Blackberry®, Symbian®-based phone, Palm®-based phone, etc.) and/or a feature phone.

The mobile apparatus 600 includes at least one communication module 602, although only one communication module 602 is shown in FIG. 6. The communication module 602 includes, but is not limited to, a Wi-Fi communication module, a mobile communication module, a Bluetooth communication module, etc. The mobile apparatus 600 can establish a communication with other networks and devices with the communication module 602.

The mobile apparatus 600 also includes a processing unit 604 coupled to the communication module 602. The processing unit 604 may be configured to execute instructions and processing data. For example, the processing unit 604 may execute the OS, applications, etc. In some embodiments, the processing unit 604 may includes one or more execution core, a plurality of registers and one or more cache memory.

The processing unit 604 may be configured to perform any of, a part of or parts of, the embodiments discussed herein. For example, the processing unit 604 may perform the process 200 of device finding shown in FIG. 2, or parts of the processes 400-500 as shown in FIGS. 4-5.

In some embodiments, the processing unit 604 may read and execute instructions stored on a machine-readable medium to perform the processes or operations described herein. A machine-readable medium may include any mechanism for storing or transmitting information in a form readable by a machine. For example, a machine-readable medium may include read only memory (ROM); random access memory (RAM); magnetic disk storage media; optical storage media; flash memory devices; or the like.

Figure 7:
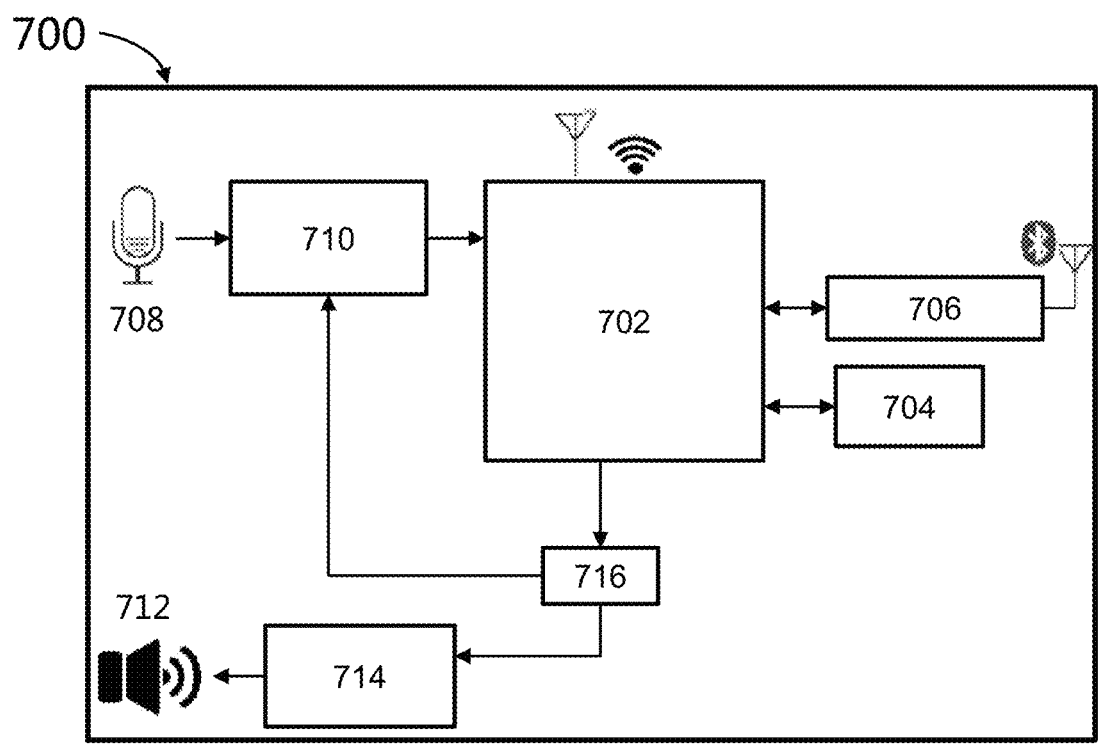
FIG. 7 illustrates an exemplary block diagram of a smart device according to an embodiment of present disclosure.

FIG. 7 illustrates an exemplary block diagram of a smart device 700 according to an embodiment of present disclosure. The smart device 700 may include, but is not limited to, a smart lamp, an intelligent electrical apparatus such as an intelligent speaker and an intelligent television, etc.

As shown, the smart device 700 includes a Wi-Fi module 702 for Wi-Fi communication with other devices and networks. In some embodiments, the Wi-Fi module 702 may transmit and receive a message from other devices, for example, the mobile apparatus as discussed herein. The Wi-Fi module 702 can switch between an AP mode and a station mode.

In some embodiments, upon receiving a message comprising information for connecting to a router or AP, the Wi-Fi module 702 changes to a station mode, and utilizes the information to connect to the router or AP. In some embodiments, the Wi-Fi module 702 may register in the cloud for facilitating possible cloud scanning.

In addition, the smart device 700 may include other components. For example, the smart device 700 may include a microcontroller unit (MCU) 704 and a Bluetooth Low Energy (BLE) module 706 coupled with the Wi-Fi module 702. The MCU 704 may communicate with and control the operation of the Wi-Fi module 702. In some embodiments, the MCU 704 may be integrated into the Wi-Fi module 702, although it has been shown as a separate component in FIG. 7. The BLE module 706 is used for BLE communication with other devices. In some embodiments, the smart device 700 is a smart lamp, and the BLE module 706 can communicate with one or more Bluetooth-enabled smart electronic bulbs. The smart lamp 700 and electronic bulbs may form a mesh network where the smart lamp 700 acts as a hub. The bulbs may be LED bulbs.

The smart device 700 may also include an input device, such as a microphone 708 coupled to the Wi-Fi-module 702 with a digital signal processing (DSP) 710, and an output device, such as a speaker 712 coupled to the Wi-Fi module 702 with a power amplifier 714 and a Digital-to-Analog Converter (DAC) 716, as shown in FIG. 7. The DAC 716 may be coupled to the DSP 710 through a feedback line. The microphone 708 is able to receive voice instructions from a user, and then the DSP 710 can process the voice instructions and provide them to the Wi-Fi module 702. On the other side, the speaker 712 is able to output voice signals which are output from the Wi-Fi module 702, converted to analog signals in DAC 716 and amplified by power amplifier 714.

The embodiments of present disclosure have many advantages over the prior art. For example, some embodiments can improve the success rate for device finding or Wi-Fi configuration. Besides, the smart apparatus (e.g., mobile apparatus 102, 302) or a user can choose preferred network freely, rather than being limited to the same network (e.g., the same router or AP) as that of the targeted smart device. Further, since the local communication is faster and more stable, the local scanning is preferable and, if possible, performed first, while the cloud scanning is performed when the local scanning is not applicable or fails. Therefore, the embodiments of present disclosure can bring better user experience than prior art.

It is to be noted that, although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

The present disclosure is not restricted to the particular details listed herein. Indeed, those skilled in the art having the benefit of this disclosure will appreciate that many other modifications and variations from the foregoing description and drawings may be made within the scope of the present disclosure. It should be recognized that the intention of the claims is to cover all these modifications and variations within the real concept and range of the present disclosure. Accordingly, it is the following claims including any amendments thereto that define the scope of the present disclosure.

What is claimed is:

1. A method for device finding, comprising:
    sending, by a mobile apparatus, a message to a smart device in an Access Point (AP) mode, the message comprising information for connecting to a first router or AP;
    changing, by the mobile apparatus, connection from the smart device to a network;
    performing, by the mobile apparatus, a local scanning for the smart device to establish a connection to the smart device when connecting to the first router or AP; and
    performing, by the mobile apparatus, a cloud scanning for the smart device to establish a connection to the smart device when the local scanning fails.

2. The method of claim 1, wherein the changing connection to a network comprises manually or automatically connecting to one of the first router or AP, a second router or AP, and a mobile communication network.

3. The method of claim 2, further comprising:
    when connecting to the mobile communication network, performing a cloud scanning; and
    when connecting to the second router or AP,
        performing a local scanning; and
        performing a cloud scanning when the local scanning fails.

4. The method of claim 1, wherein the changing connection to a network comprises controlling the selection of one of the first router or AP, a second router or AP, and a mobile communication network.

5. The method of claim 4, further comprising:
    performing a cloud scanning when connecting to the mobile communication network or the second router or AP.

6. The method of claim 4, wherein the controlling the selection comprising:
    controlling the selection according to a predetermined rule or a user input, wherein the predetermined rule comprises a preference of the user, a priority list of available networks, and a connection strategy.

7. The method of claim 1, wherein the information comprises a Service Set Identifier (SSID) and a password for connecting to the first router or AP.

8. A mobile apparatus, comprising:
    at least one communication module;
    a processing unit coupled to the at least one communication module, the processing unit to:
        send a message to a smart device in an Access Point (AP) mode, the message comprising information for connecting to a first router or AP;
        change connection from the smart device to a network;
        perform a local scanning for the smart device to establish a connection to the smart device when connecting to the first router or AP; and
        perform a cloud scanning for the smart device to establish a connection to the smart device when the local scanning fails.

9. The mobile apparatus of claim 8, further comprising an operating system, wherein the processing unit is further to execute the operating system to change connection to the network by automatically connecting to or receiving manual selection of one of the first router or AP, a second router or AP, and a mobile communication network.

10. The mobile apparatus of claim 9, the processing unit is further to:
    when connecting to the mobile communication network, perform a cloud scanning; and
    when connecting to the second router or AP,
        perform a local scanning; and
        perform a cloud scanning when the local scanning fails.

11. The mobile apparatus of claim 8, the processing unit is further to change connection from the smart device to the network by controlling selection of one of the first router or AP, a second router or AP, and a mobile communication network.

12. The mobile apparatus of claim 11, the processing unit is further to
    perform a cloud scanning when connecting to the mobile communication network or the second router or AP.

13. The mobile apparatus of claim 11, wherein the processing unit is further to control the selection according to a predetermined rule or a user input, wherein the predetermined rule comprises a preference of the user, a priority list of available networks, and a connection strategy.

14. The mobile apparatus of claim 8, wherein the mobile apparatus comprises one of smart phone, a personal digital assistant, a tablet computer, a laptop computer, an ultraportable computer, an ultramobile computer, and wherein the smart device comprises a smart lamp or an intelligent electrical apparatus.

15. The mobile apparatus of claim 8, wherein the smart device comprises a Wi-Fi module to:
receive the message from the mobile apparatus;
change to a station mode;
connect to the first router or AP with the information in the message; and
register in the cloud.

16. The mobile of claim 15, wherein for the cloud scanning, the processing unit is further to:
establish a connection with the cloud; and
search a database of the cloud for registration information of the smart device.

17. A non-transitory machine readable medium having stored thereon instructions, when executed, to cause a machine to:
send a message to a smart device in an Access Point (AP) mode, the message comprising information for connecting to a first router or AP;
determine a change of connection from the smart device to a network;
perform a local scanning for the smart device to establish a connection to the smart device when connecting to the first router or AP; and
perform a cloud scanning for the smart device to establish a connection to the smart device when the local scanning fails.

18. The non-transitory machine readable medium of claim 17, comprising instructions, when executed, to cause the machine to:
performing a cloud scanning when the change of connection comprises connecting to a mobile communication network; and
when the change of connection comprises connecting to a second router or AP,
performing a local scanning; and
performing a cloud scanning when the local scanning fails.

19. The non-transitory machine readable medium of claim 17, comprising instructions, when executed, to cause a machine to:
control the selection of one of the first router or AP, a second router or AP, and a mobile communication network.

20. The non-transitory machine readable medium of claim 19, comprising instructions, when executed, to cause a machine to:
perform a cloud scanning when the change of connection comprises connecting to the mobile communication network or the second router or AP.

* * * * *